(12) United States Patent
Nakayama et al.

(10) Patent No.: US 10,715,001 B2
(45) Date of Patent: Jul. 14, 2020

(54) DYNAMO-ELECTRIC MACHINE

(71) Applicant: Hitachi Automotive Systems, Ltd., Hitachinaka-shi, Ibaraki (JP)

(72) Inventors: Kenichi Nakayama, Hitachinaka (JP); Naoki Nishikawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 334 days.

(21) Appl. No.: 15/635,269

(22) Filed: Jun. 28, 2017

(65) Prior Publication Data
US 2019/0006900 A1    Jan. 3, 2019

(51) Int. Cl.
*H02K 3/32* (2006.01)
*H02K 1/16* (2006.01)
*H02K 3/38* (2006.01)

(52) U.S. Cl.
CPC .............. *H02K 3/32* (2013.01); *H02K 1/16* (2013.01); *H02K 3/38* (2013.01); *H02K 2203/06* (2013.01)

(58) Field of Classification Search
CPC ........ H02K 1/16; H02K 2203/06; H02K 3/32; H02K 3/38; H02K 1/18; H02K 1/185; H02K 3/34; H02K 3/50
USPC .................................................. 310/214, 215
See application file for complete search history.

(56) References Cited

U.S. PATENT DOCUMENTS

| 5,659,219 A * | 8/1997 | Momose | H02K 3/38 29/596 |
| 6,888,281 B2 * | 5/2005 | Koike | H02K 3/505 310/179 |
| 7,701,109 B2 * | 4/2010 | Ishikawa | H02K 1/145 310/257 |
| 10,305,335 B2 * | 5/2019 | Nakayama | H02K 1/04 |
| 10,305,339 B2 * | 5/2019 | Awazu | H02K 3/48 |
| 2010/0013349 A1 * | 1/2010 | Breden | H02K 3/38 310/260 |
| 2011/0181143 A1 | 7/2011 | Hasegawa et al. | |
| 2012/0274174 A1 * | 11/2012 | Uchida | H02K 3/38 310/254.1 |
| 2013/0127290 A1 * | 5/2013 | Matsubara | H02K 3/38 310/208 |
| 2014/0127055 A1 | 5/2014 | Horiba et al. | |

(Continued)

FOREIGN PATENT DOCUMENTS

JP  54-169202 U  11/1979
JP  2-133046 A   5/1990

(Continued)

OTHER PUBLICATIONS

International Search Report (PCT/ISA/210) issued in PCT Application No. PCT/JP2018/014877 dated Jun. 19, 2018 (three (3) pages).

*Primary Examiner* — Bernard Rojas
(74) *Attorney, Agent, or Firm* — Crowell & Moring LLP

(57) ABSTRACT

To improve insulation reliability of a dynamo-electric machine. A stator or a dynamo-electric machine using the stator according to the present invention includes a stator iron core in which a plurality of slots aligned in the circumferential direction are formed, a plurality of segment coils inserted into the slots and formed nearly into a U-shape, and an insulator arranged between the segment coils, and the insulator has a part of the insulator formed thicker than the other part of the insulator.

5 Claims, 16 Drawing Sheets

(56) References Cited

U.S. PATENT DOCUMENTS

| | | | |
|---|---|---|---|
| 2015/0022045 A1* | 1/2015 | Hagiwara | H02K 3/38 |
| | | | 310/201 |
| 2015/0171693 A1* | 6/2015 | Sakaue | H02K 3/28 |
| | | | 310/215 |

FOREIGN PATENT DOCUMENTS

| | | |
|---|---|---|
| JP | 2011-151975 A | 8/2011 |
| JP | 2012-80699 A | 4/2012 |
| JP | 2014-96855 A | 5/2014 |

* cited by examiner

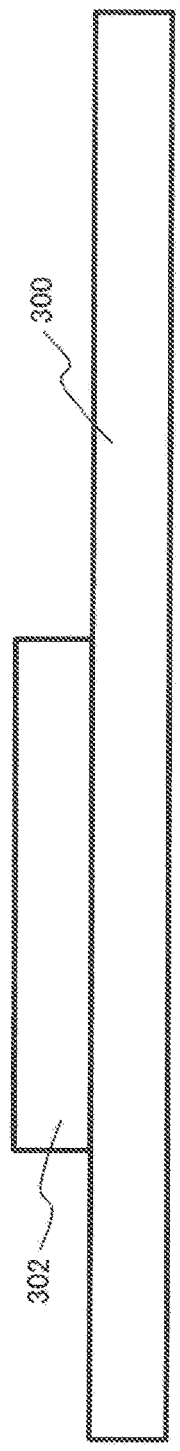
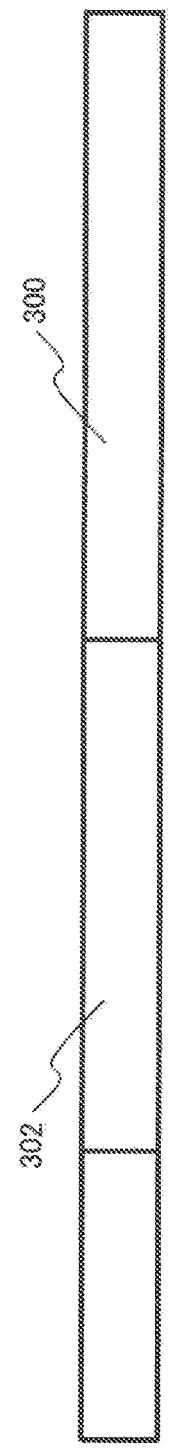
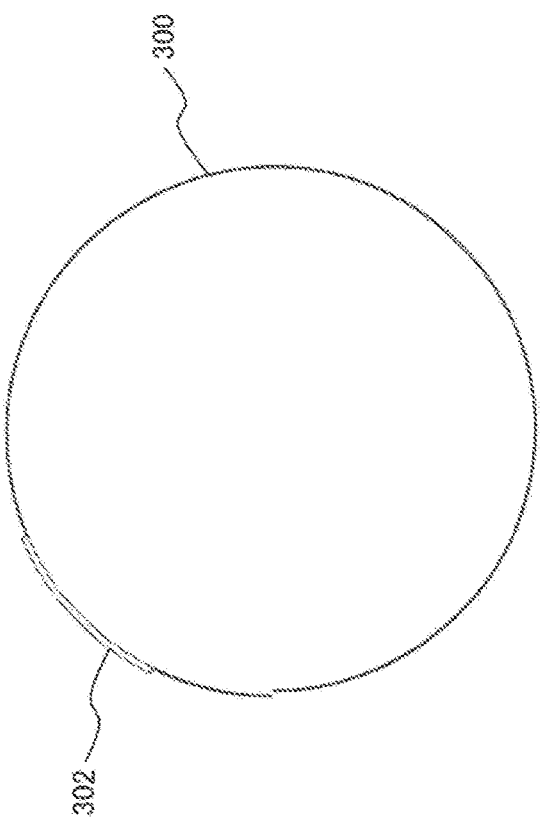
FIG. 17A
FIG. 17B
FIG. 17C ions US 10,715,001 B2

DYNAMO-ELECTRIC MACHINE

FIELD OF THE INVENTION

The present invention relates to a stator and a dynamo-electric machine using the stator; in particular to a dynamo-electric machine to generate torque for running an automobile or generate electricity during braking.

BACKGROUND OF THE INVENTION

In a dynamo-electric machine, a rotating magnetic field is generated by supplying AC power to a stator winding wire and a rotator is rotated by the rotating magnetic field. Further, it is also possible to convert mechanical energy added to a rotator into electric energy and output AC power from a coil. In this way, a dynamo-electric machine operates as an electric motor or an electric generator.

As a stator of such a dynamo-electric machine, a configuration of connecting terminals of segment coils by welding is known (refer to Japanese Patent Laid-Open No. 2011-151975, for example).

When a dynamo-electric machine of this kind is mounted over an automobile, downsizing is required because the dynamo-electric machine is attached in a narrowly limited space. Low coil ends have been required in association with the downsizing. To this end, it is required to reduce the height of a coil end part and secure an insulation distance in a narrowly limited space. To secure a stable insulation distance in a segment coil has been a problem. Further, after switching operation of a switching element in an inverter apparatus, a steep surge voltage is inputted from the inverter apparatus to the input point of each phase. On this occasion, although it is desirable to optimize the thickness of an insulation film in proportion to the voltage sharing ratio of each coil, the thickness of the insulation film of each coil can be difficult to be increased because the increase of thickness causes productivity to deteriorate from the viewpoint of the formability of the coil.

SUMMARY OF THE INVENTION

A stator or a dynamo-electric machine using the stator according to the present invention includes a stator iron core in which a plurality of slots aligned in the circumferential direction are formed, a plurality of segment coils inserted into the slots and formed nearly into a U-shape, and an insulator arranged between the segment coils, and the insulator has a part of the insulator formed thicker than the other part of the insulator.

The present invention makes it possible to improve the insulation reliability of a dynamo-electric machine.

BRIEF DESCRIPTION OF THE DRAWINGS

As shown in FIG. 9 and FIG. 10, a neutral point connecting conductor 40N1 is connected to another end of a U1-phase coil 60U1 and a neutral point connecting conductor 40N2 is connected to another end of a U2-phase coil 60U2;

FIG. 17A is a side view of an insulator 300 before an overlapping part 302 is folded according to another embodiment;

FIG. 17B is a side view of an insulator 300 after an overlapping part 302 is folded according to another embodiment;

FIG. 17C shows an insulator 300 according to another embodiment viewed from the direction parallel to the rotation axis of a dynamo-electric machine 10.

DETAILED DESCRIPTION OF THE PREFERRED EMBODIMENTS

Figure 18:
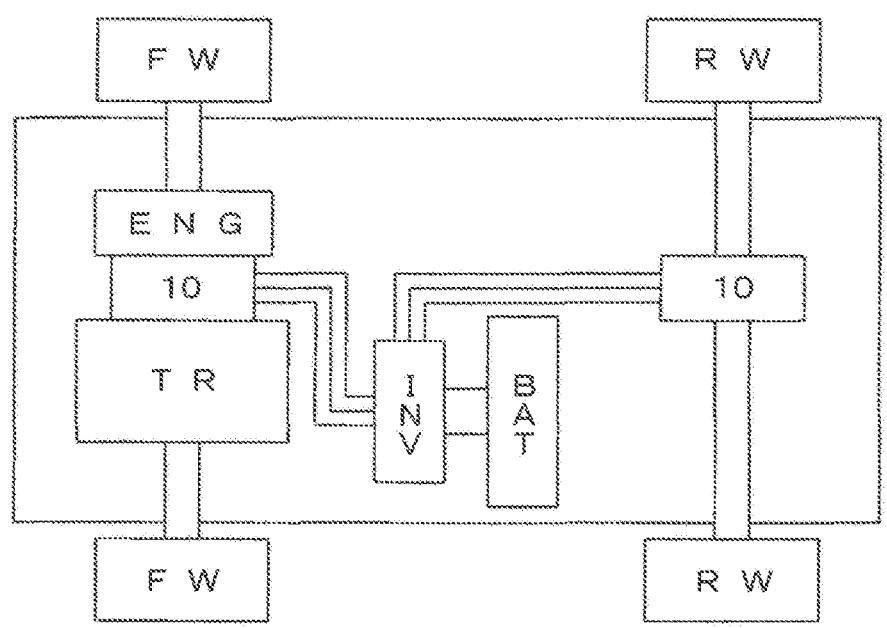
FIG. 18 shows a schematic configuration of a hybrid-type electric vehicle over which a dynamo-electric machine 10 according to the present embodiment is mounted.

Embodiments for carrying out the present invention are hereunder explained in reference to FIG. 18. A dynamo-electric machine 10 according to the present embodiment is a dynamo-electric machine suitable for being used in the running of an automobile. Here, as so-called electric vehicles each of which uses a dynamo-electric machine 10, there are a hybrid-type electric vehicle (HEV) having both an engine ENG and a dynamo-electric machine 10 and a genuine electric vehicle (EV) running by only a dynamo-electric machine 10 without using an engine ENG. A dynamo-electric machine explained hereunder can be used in both the types and hence explanations are made on the basis of a dynamo-electric machine used in a hybrid-type vehicle here as a representative.

Further, in the explanations below, an "axial direction" indicates a direction parallel to the rotation axis of a dynamo-electric machine. A circumferential direction indicates a direction parallel to the rotation direction of a dynamo-electric machine. A "radial direction" indicates a direction of a moving radius (a radius direction) extending radially from the rotation axis of a dynamo-electric machine.

An "inner circumference side" indicates an inner side in a radial direction (inner diameter side) and an "outer circumference side" indicates the opposite side, namely an outer side in a radial direction (outer diameter side).

(Schematic Configuration of Vehicle)

Firstly, a schematic configuration of a vehicle over which a dynamo-electric machine is mounted is explained in reference to FIG. 18. A vehicle has an engine ENG and a dynamo-electric machine 10 as a main power on the front wheel side. The power generated by the engine ENG and the dynamo-electric machine 10 is shifted by a transmission TR and transmitted to front wheel side drive wheels FW. Further, with regard to the drive of rear wheels, a dynamo-electric machine 10 arranged on the rear wheel side and rear wheel side drive wheels RW are connected mechanically and power is transmitted. The dynamo-electric machine 10 that is a power source on the front wheel side is arranged between the engine ENG and the transmission TR.

The dynamo-electric machine 10: starts the engine; and switches the generation of a driving force and the generation of electricity to recover energy as electric energy during vehicle deceleration in conformity with the running state of a vehicle. The operations of drive and electricity generation in the dynamo-electric machine 10 are controlled by an inverter INV so that torque and the number of revolutions may be optimized in conformity with the driving situation of a vehicle. Electric power required for driving the dynamo-electric machine 10 is supplied from a battery BAT through the inverter INV. Further, when the dynamo-electric machine 10 is under electricity generation operation, electric energy is charged in the battery BAT through the inverter INV.

The dynamo-electric machine 10 is a three-phase synchronous motor having a built-in permanent magnet. The dynamo-electric machine 10 acts as an electric motor of rotating a rotator by supplying three-phase alternating current to a stator coil. Further, the dynamo-electric machine 10 acts as an electricity generator and outputs generated electric power of three-phase alternating current when it is driven by an engine. That is, the dynamo-electric machine 10: has both a function as an electric motor to generate rotation torque on the basis of electric energy and a function as an electricity generator to generate electricity on the basis of mechanical energy; and can selectively use the functions in conformity with the running state of a vehicle.

(Explanation of Dynamo-Electric Machine 10)

Figure 1:
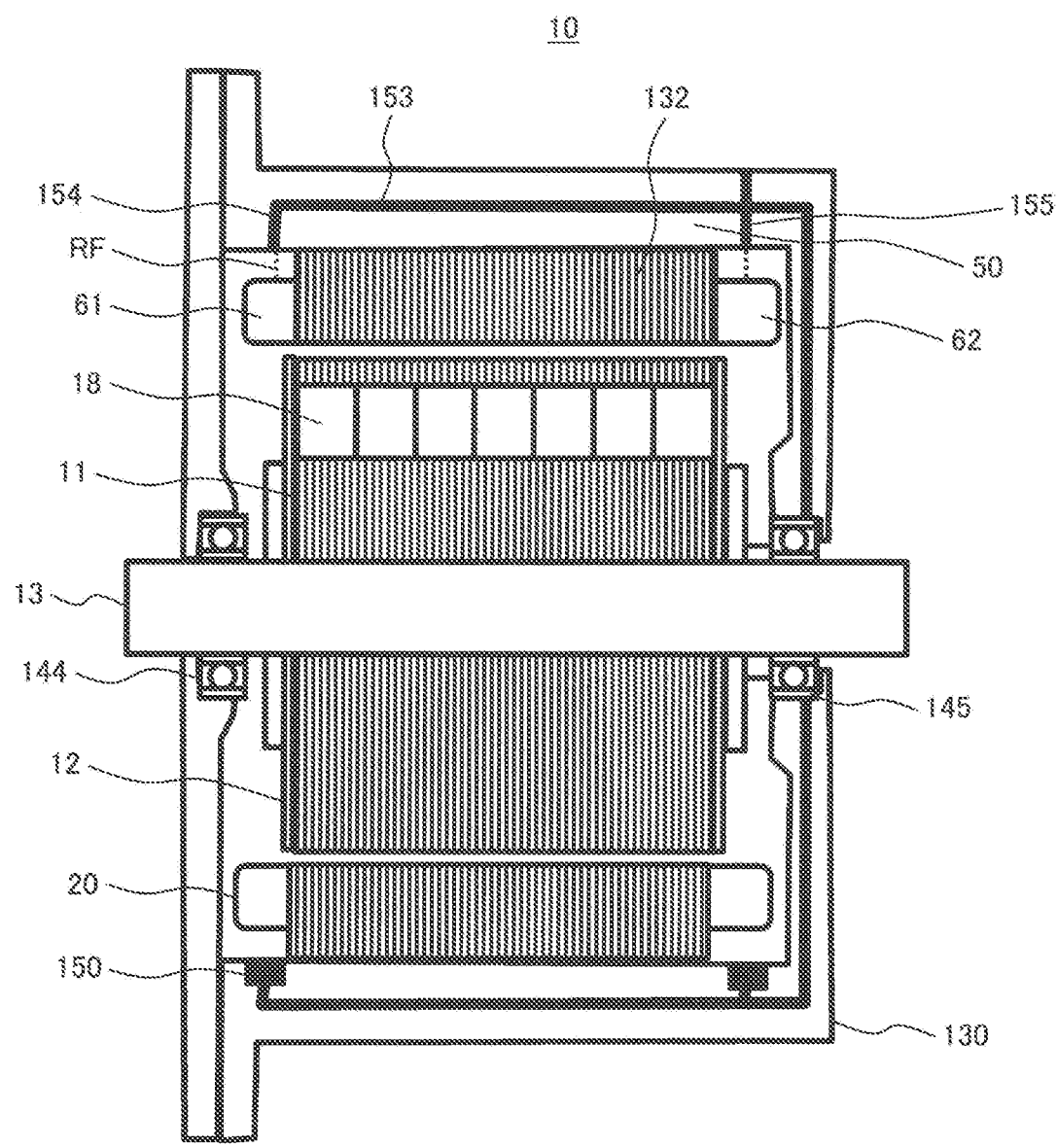
FIG. 1 is a sectional view of a dynamo-electric machine 10 according to the present embodiment.

FIG. 1 is a sectional view of a dynamo-electric machine 10 according to the present embodiment. In the present embodiment, the dynamo-electric machine 10 is disposed in the interior of a liquid-cooled jacket 130. The liquid-cooled jacket 130 includes a case of an engine ENG and a case of a transmission TR. The dynamo-electric machine 10 includes a stator 20, a housing 50 to retain the stator 20, and a rotator 11.

The liquid-cooled jacket 130 is fixed on the outer circumference side of the housing 50. A refrigerant flow channel 153 of a liquefied refrigerant RF such as an oil is formed by an internal wall of the liquid-cooled jacket 130 and an external wall of the housing 50. A shaft 13 to which the rotator 11 is fixed is rotatably supported by a bearing 144 and a bearing 145 arranged in the liquid-cooled jacket 130. For the reason, the liquid-cooled jacket 130 is also called a bearing bracket.

Here, in the case of a direct liquid cooling system, as a refrigerant RF, a liquid accumulating in a refrigerant storage space 150: passes through the refrigerant flow channel 153; further flows out toward the stator 20 through a refrigerant flow channel 154 and a refrigerant flow channel 155; and cools the stator 20. The refrigerant RF here may also be an oil for cooling.

The stator 20 is fixed on the inner circumference side of the housing 50. The rotator 11 is rotatably supported on the inner circumference side of the stator 20. The housing 50: is formed into a cylindrical shape by machining a ferrous material such as a carbon steel, casting a steel or an aluminum alloy, or press forming; and constitutes the outer cover of the dynamo-electric machine 10. The housing 50 is also called a frame body or a frame.

The housing 50 is formed into a cylindrical shape by drawing a steel plate (high tensile steel plate or the like) about 2 to 5 mm in thickness. A plurality of flanges (not shown in the figure) attached to the liquid cooled jacket 130 are arranged in the housing 50. The flanges are formed protrusively outward in radial directions at a rim on an end plane of the cylindrical housing 50. Here, the flanges are formed by cutting away the part other than the flanges at an end formed during the drawing and are integrated with the housing 50. Here, it is also possible to fix the stator 20 directly to the liquid cooled jacket 130 that is the case without forming the housing 50.

Figure 2:
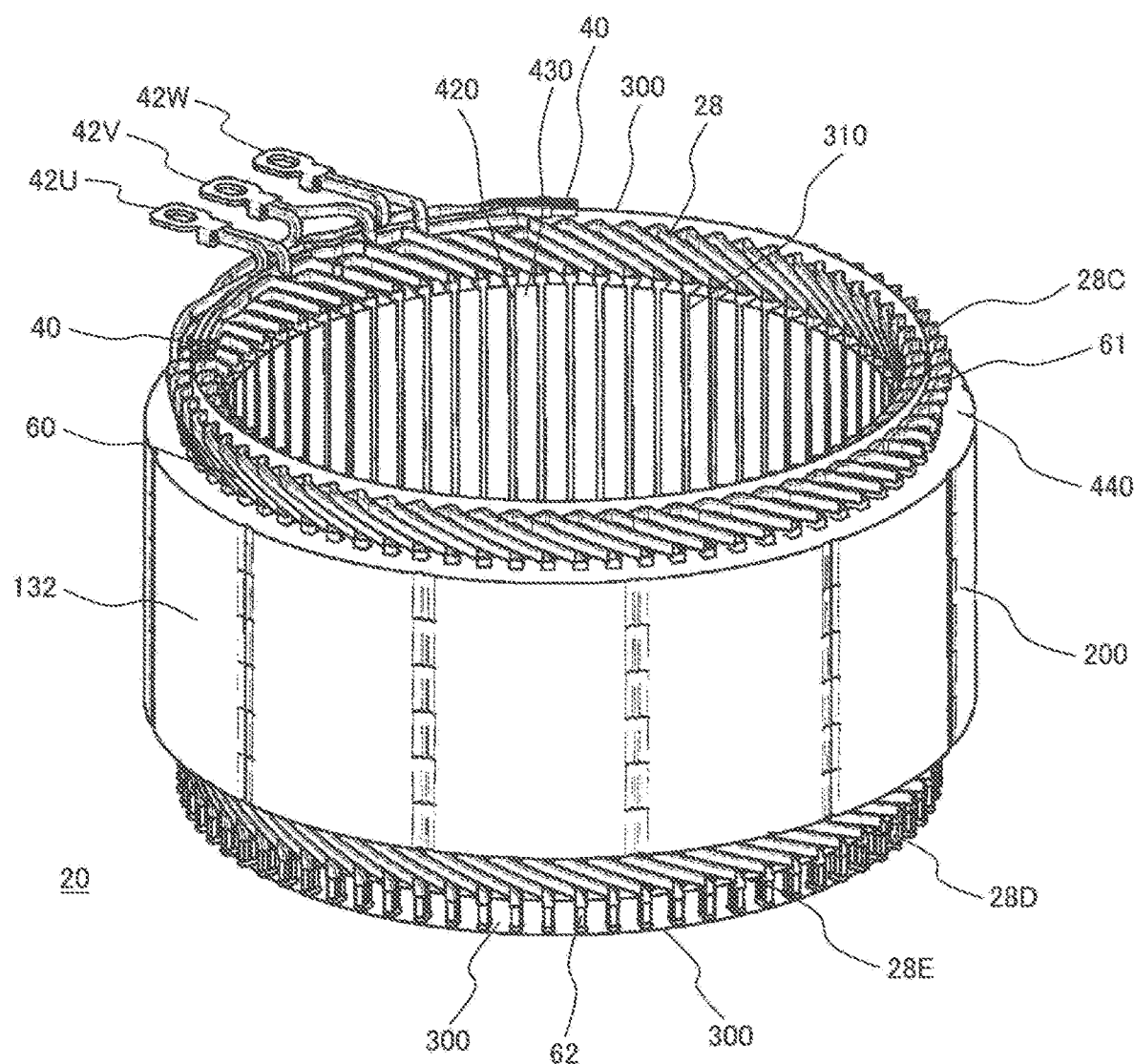
FIG. 2 is an overall perspective view of a stator 20.
Figure 3:
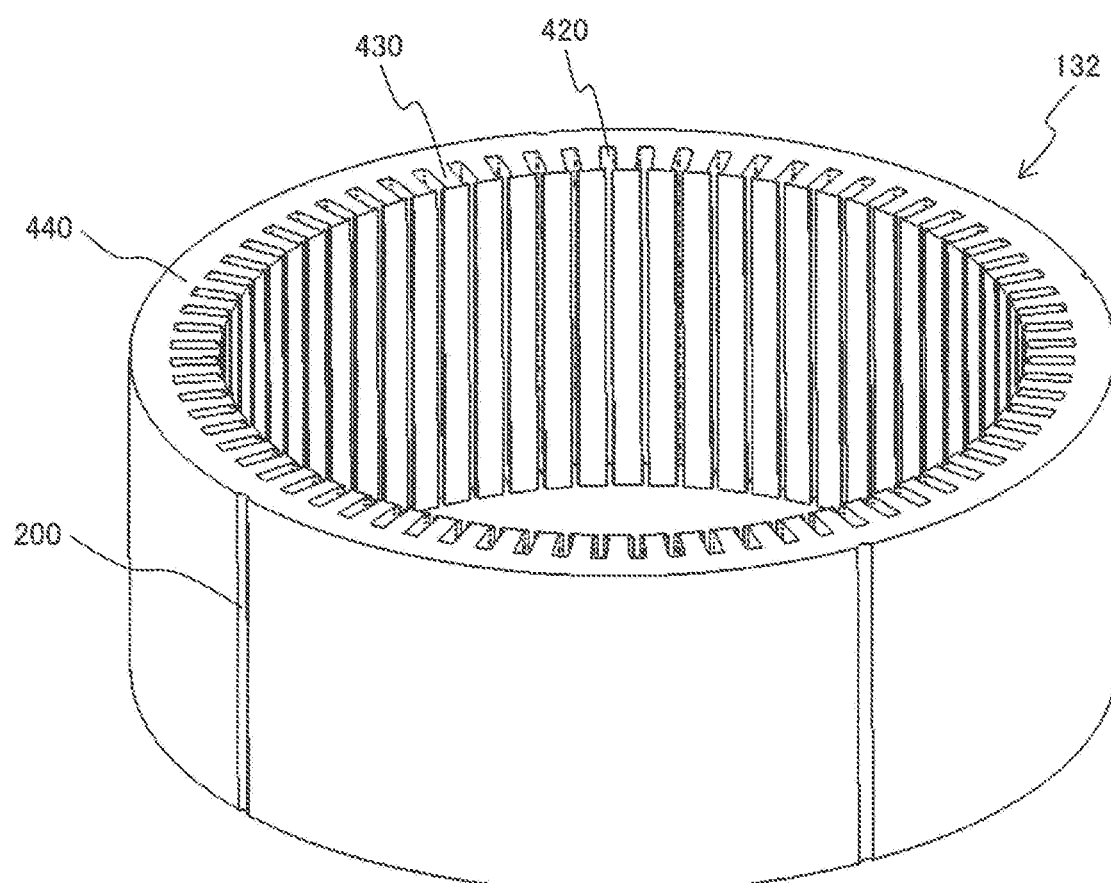
FIG. 3 is an overall perspective view of a stator iron core 132.

FIG. 2 is an overall perspective view of a stator 20. FIG. 3 is an overall perspective view of a stator iron core 132. As shown in FIG. 2, the stator 20 includes a stator iron core 132 and a stator coil 60. The stator iron core 132 is formed by stacking thin silicon steel sheets. The stator coil 60 is wound around a plurality of slots 420 formed at the inner circumference part of the stator iron core 132. The heat generated from the stator coil 60 is transferred to a liquid cooled jacket 130 through the stator iron core 132 and is dissipated by a refrigerant RF flowing in the liquid cooled jacket 130.

Figure 4:
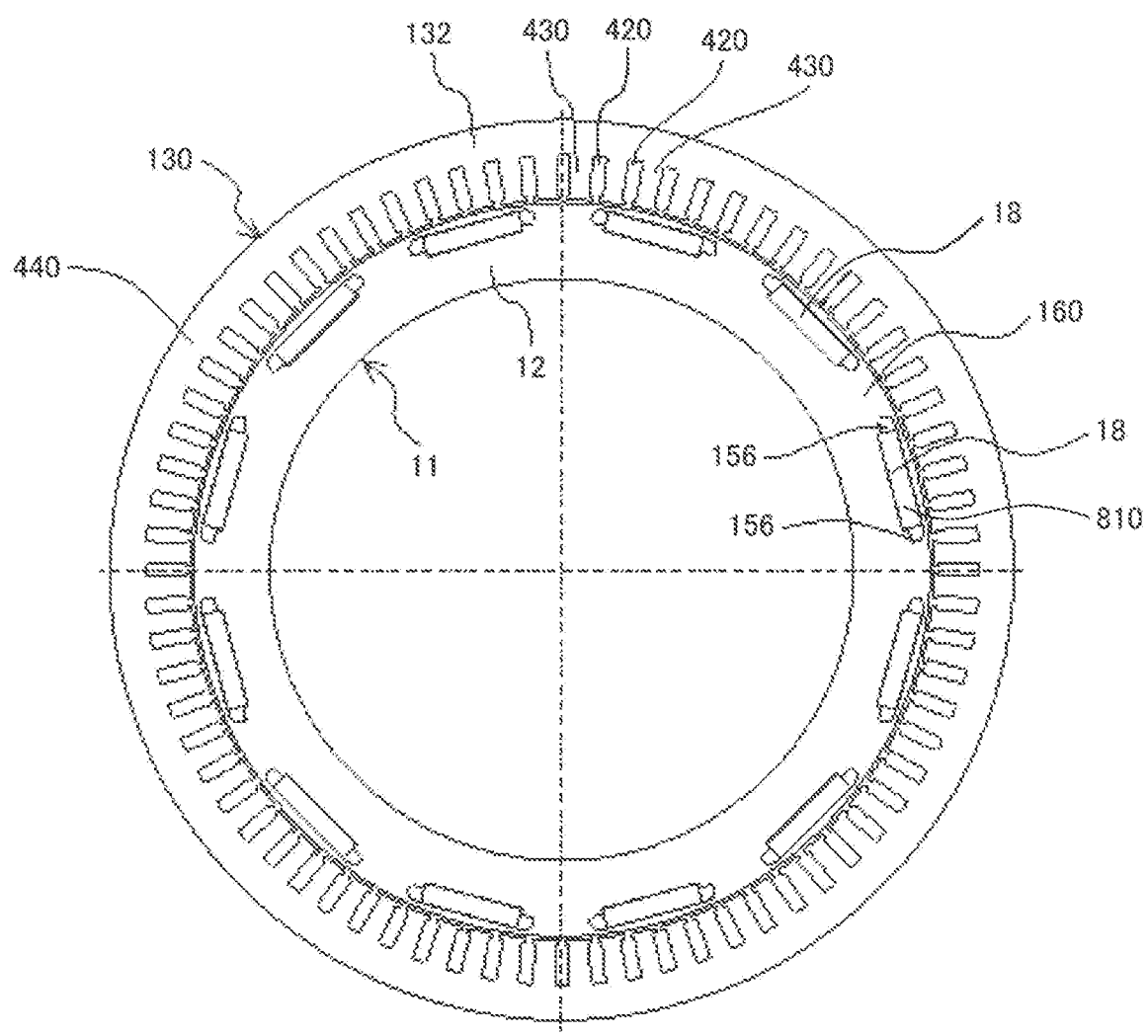
FIG. 4 is a sectional view showing cross sections of a rotator 11 and a stator iron core 132.

As shown in FIG. 1, a rotator 11 comprises a rotator iron core 12 and a shaft 13. FIG. 4 is a sectional view showing cross sections of a rotator 11 and a stator iron core 132. Here, the shaft 13 is excluded from FIG. 4. The rotator iron core 12 is formed by stacking thin silicon steel sheets. The shaft 13 is fixed in the center of the rotator iron core 12. The shaft 13: is rotatably retained by a bearing 144 and a bearing 145 attached to the liquid cooled jacket 130 as shown in FIG. 1; and rotates at a predetermined position facing the stator 20 in the stator 20. Further, permanent magnets 18 and end rings, although they are excluded from FIG. 1, are arranged in the rotator 11.

As shown in FIG. 3, in the stator iron core 132, a plurality of slots 420 parallel to the axial direction of the stator iron core 132 are formed at equal intervals in the circumferential direction. The number of the slots 420 is 72, for example, in the present embodiment and the stator coil 60 is contained in the slots 420. Each of the slots 420 opens on the inner circumference side and the width of the opening in the circumferential direction is nearly equal to or somewhat smaller than the width of the part, in which the stator coil 60 is installed, of the slot 420.

Teeth 430 are formed between the slots 420 and the teeth 430 are integrated with an annular core back 440. That is, the stator iron core 132 is a monolithic core formed by integrally molding the teeth 430 and the core back 440. The teeth 430 lead a rotating field generated by the stator coil 60 to the rotator 11 and generate a rotation torque to the rotator 11.

The stator iron core 132 is formed by stamping an electrical steel sheet about 0.05 to 1.0 mm in thickness and stacking a plurality of the stamped annular electrical steel sheets. Welded parts 200 are arranged parallel to the axial direction of the stator iron core 132 at outer circumferential parts of the cylindrical stator iron core 132 by TIG welding, laser welding, or the like. Here, it is also possible to fix the stator iron core 132 by caulking or the like and inserting the stator iron core 132 directly into a case without arranging welded parts 200.

FIG. 4 is a sectional view of a rotator 11 and a stator 20 taken on a plane perpendicular to the axial direction. Magnet insertion holes 810 into which rectangular permanent magnets 18 are inserted are formed at equal intervals in a rotator iron core 12. Each of the permanent magnets 18 is fixed to each of the magnet insertion holes 810 by an adhesive, powder resin, a mold, or the like. The width of each of the magnet insertion holes 810 in the circumferential direction is set so as to be larger than the width of each of the permanent magnets 18 in the circumferential direction and magnetic gaps 156 are formed on both the sides of each of the permanent magnets 18. The magnetic gaps 156 either may be filled with an adhesive or may be fastened integrally with the permanent magnets 18 by a molding resin. The permanent magnets 18 act so as to form field poles in the rotator 11. Although one permanent magnet 18 constitutes one magnetic pole in the present embodiment, the number of permanent magnets 18 constituting each field pole may be increased to two or more and, by increasing the number of the permanent magnets 18, it is possible to increase the magnetic flux density of each magnetic pole generated by each permanent magnet and increase a magnet torque.

The magnetization direction of each of the permanent magnets 18 is directed to a radial direction and the orientations of the magnetization are reversed every field pole. That is, when the stator side plane of a permanent magnet 18 for forming a certain magnetic pole is magnetized to an N-pole and the plane on the axis side is magnetized to an S-pole, the stator side plane of an adjacent permanent magnet 18 for forming a magnetic pole is magnetized so as to be an S-pole and the plane on the axis side is magnetized so as to be an N-pole. The permanent magnets 18: are magnetized so that the magnetization directions of the magnetic poles may change alternately in the circumferential direction; and are arranged. In the present embodiment, twelve permanent magnets 18 are arranged at equal intervals and the rotator 11 forms twelve magnetic poles.

Meanwhile, as a permanent magnet 18, a sintered magnet or a ferrite magnet of a neodymium series or a samarium series, a bond magnet of a neodymium series, or the like can be used. In the present embodiment, auxiliary magnetic poles 160 are formed between the permanent magnets 18 forming magnetic poles. The auxiliary magnetic poles 160 function so as to reduce the magnetic resistance of a magnetic flux on the q axis generated by the stator coil 60. Then by the auxiliary magnetic poles 160, the magnetic resistance of the magnetic flux on the q axis comes to be very small in comparison with the magnetic resistance of the magnetic flux on the d axis and hence a large reluctant torque is generated.

Figure 5:
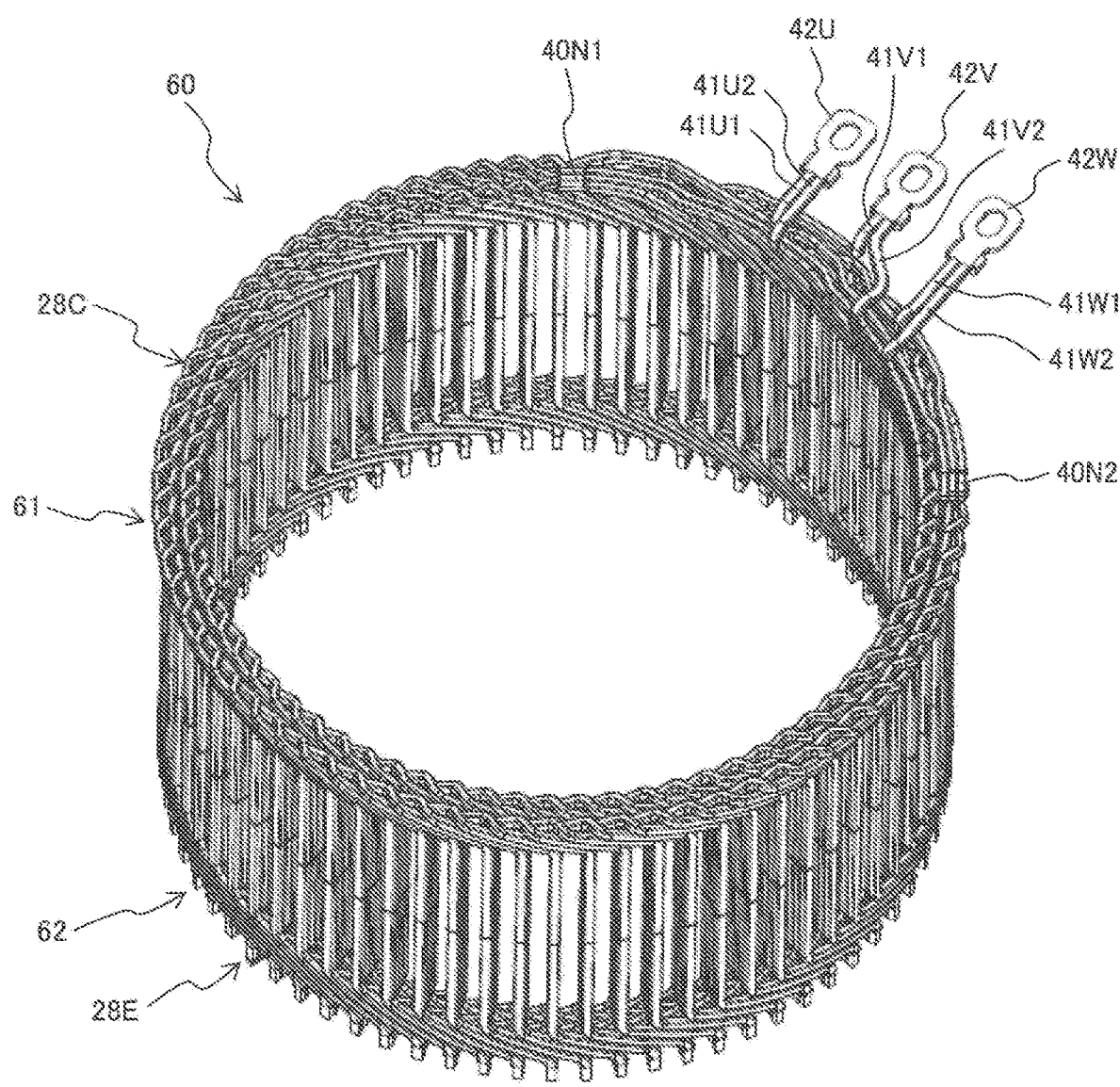
FIG. 5 is an overall perspective view showing a stator coil 60.
Figure 6:
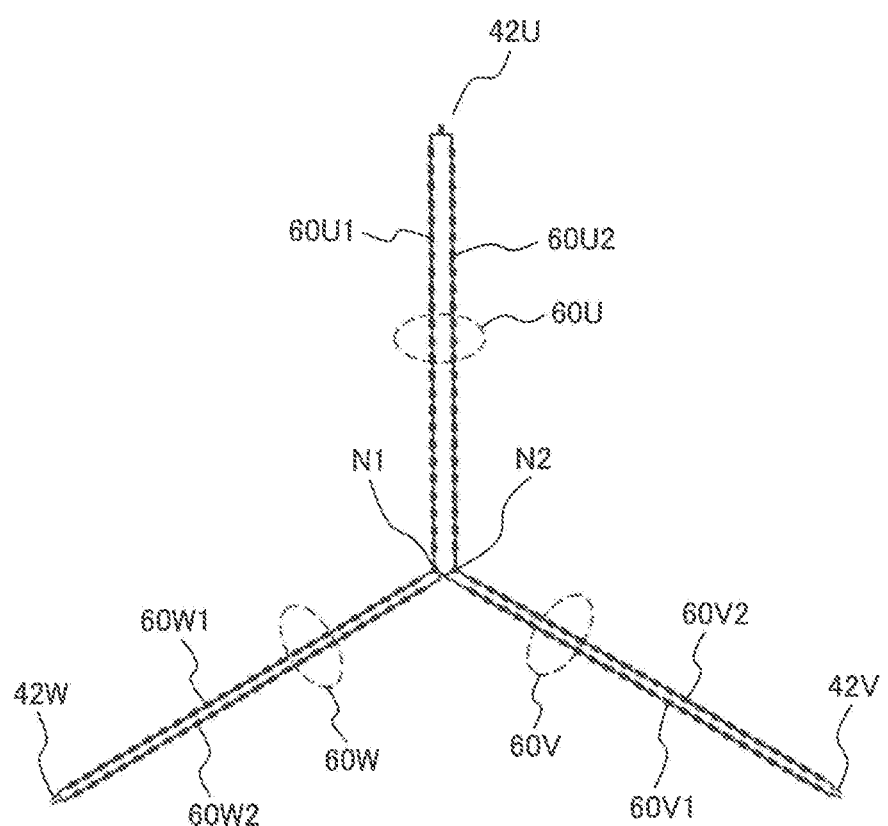
FIG. 6 is a conceptual diagram showing a connection state of a stator coil 60.

FIG. 5 is an overall perspective view showing a stator coil 60. FIG. 6 is a conceptual diagram showing a connection state of a stator coil 60. In the present embodiment, as a stator coil 60, a stator coil of a two star configuration in which two star connections are arranged in parallel to each other as shown in FIG. 6 is adopted. That is, the stator coil 60 includes a star connection of a U1-phase coil 60U1, a V1-phase coil 60V1, and a W1-phase coil 60W1 and a star connection of a U2-phase coil 60U2, a V2-phase coil 60V2, and a W2-phase coil 60W2. N1 and N2 are neutral points of the respective star connections.

The stator coil 60 may have a cross section of either a round shape or a square shape. Since such a structure as to use the cross section of the interior of a slot 420 as effectively as possible and reduce the space in the slot tends to lead to the improvement of efficiency however, across section of a square shape is desirable from the viewpoint of the improvement of efficiency. Here, the lengths of the sides of a square cross section may be set so that the length of the side in the radial direction of a stator iron core 132 may be longer or inversely the length of the side in the circumferential direction may be longer.

In the stator coil 60 according to the present embodiment, a flat wire of a rectangular cross section is used, the long sides of the rectangular cross sections are aligned in the circumferential direction of a stator iron core 132 in slots 420, and the short sides are aligned in the radial directions of the stator iron core 132. The outer circumference of the flat wire is covered with an insulation film. An oxygen-free copper or an aerobic copper is used as the stator coil 60. In the case of an aerobic copper, for example, an oxygen content is about not less than 10 ppm to 1,000 ppm.

Figure 7A:
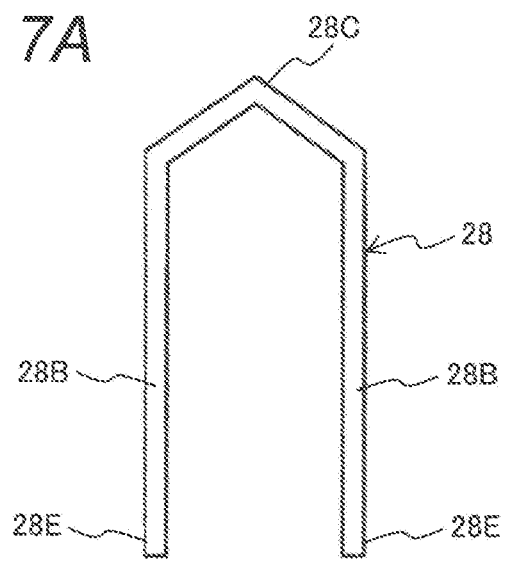
FIGS. 7A and 7B are conceptual diagrams explaining segment conductors 28 constituting a stator coil 60.
Figure 7B:
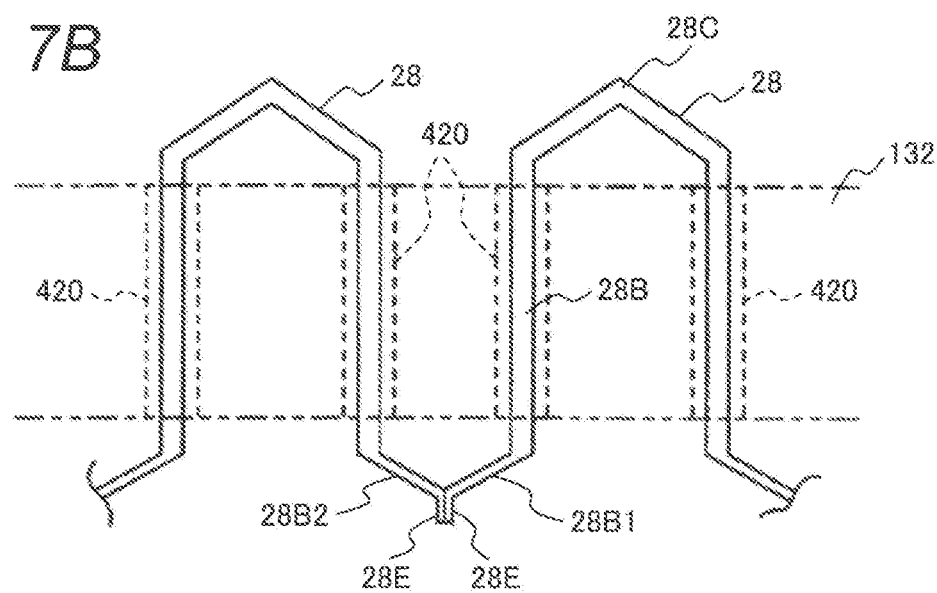

FIGS. 7A and 7B are diagrams explaining segment conductors 28 constituting a stator coil 60. FIG. 7A shows the shape of a segment conductor 28 before installed in a stator iron core 132. FIG. 7B shows the shapes of segment conductors 28 after installed in the stator iron core 132. A segment conductor 28 comprises a flat wire and is formed nearly into a U-shape having a pair of legs 28B and a crown 28C connecting the legs 28B.

When a coil of each phase is formed by connecting segment conductors 28 to each other, as shown in FIG. 7B, a pair of legs 28B of a segment conductor 28 are inserted into different slots 420 respectively from one side in the axial direction of a stator iron core 132. Successively, a leg 28B protruding toward the other side in the axial direction of the stator iron core 132 is folded in the direction of another segment conductor 28 to be connected and the edge 28E of the leg 28B is welded to an edge 28E of the other segment conductor 28.

An assemblage of crowns 28C protruding on the one side of a stator iron core 132 constitutes a coil end 61 on the one side of a stator coil 60 shown in FIG. 5. An assemblage of edges 28E protruding toward the other side of the stator iron core 132 constitutes a coil end 62 on the other side of the stator coil 60 shown in FIG. 5. The coil end 62 is referred to as a weld-side coil end 62 and the coil end 61 is referred to as an anti-weld-side coil end 61 hereunder.

As shown in FIG. 5 and FIG. 6, a lead wire 41U1 connected to an end of a U1-phase coil 60U1 and a lead wire 41U2 connected to an end of a U2-phase coil 60U2 are extracted on the side of the anti-weld-side coil end 61. The lead wire 41U1 and the lead wire 41U2 are integrated into a unit by an alternating current terminal 42U. Likewise, on the side of the anti-weld-side coil end 61, a lead wire 41V1 and a lead wire 41V2 connected to ends of a V1-phase coil 60V1 and a V2-phase coil 60V2 respectively are integrated into a unit by an alternating current terminal 42V. A lead wire 41W1 and a lead wire 41W2 connected to ends of a W1-phase coil 60W1 and a W2-phase coil 60W2 respectively are integrated into a unit by an alternating current terminal 42W.

Further, a neutral point connecting conductor 40N1 and a neutral point connecting conductor 40N2 are arranged on the side of the anti-weld-side coil end 61. The neutral point connecting conductor 40N1 relates to a neutral point N1 (refer to FIG. 6) of a star connection and the neutral point connecting conductor 40N2 relates to a neutral point N2 of the other star connection.

A stator coil 60 is wound by a method of distributed winding. The distributed winding is a winding method of winding a phase winding wire around a stator iron core 132 so that the phase winding wire may be stored in distant two slots 420 in the manner of straddling a plurality of slots 420 (refer to FIG. 3). The distributed winding is adopted as a wire winging method in the present embodiment and hence the present embodiment has the feature that the formed magnetic flux distribution is close to a sine wave in comparison with concentrated wiring and reluctance torque is likely to be generated. As a result, a dynamo-electric machine 10 makes it possible to: improve the controllability of field-weakening control and control of using reluctance torque; be used over a wide rotation speed range from a low rotation speed to a high rotation speed; and obtain excellent motor characteristics suitable for an electric vehicle.

Figure 8:
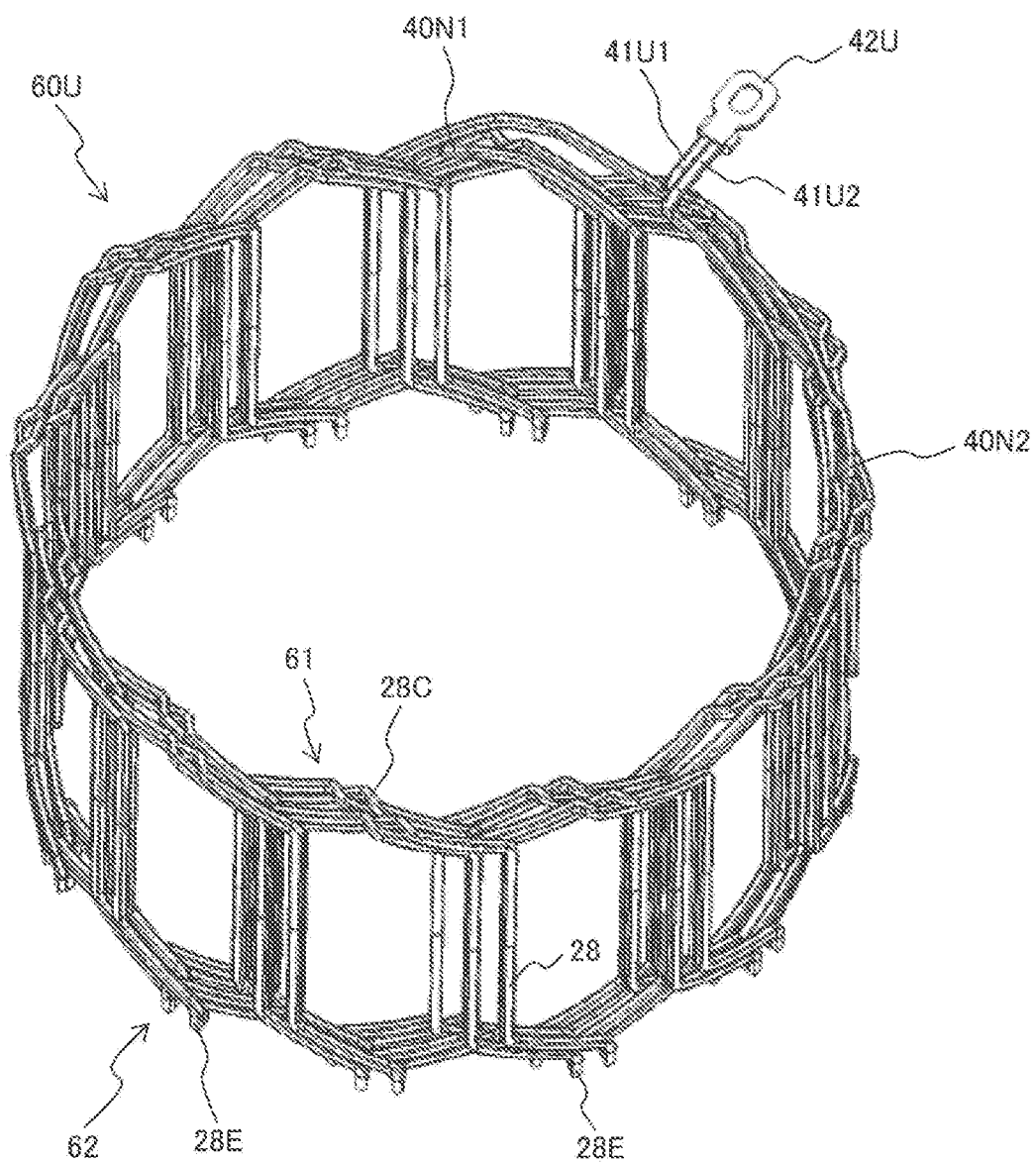
FIG. 8 is a perspective view showing a U-phase coil 60U that is a part corresponding to one phase of a stator coil 60 shown in FIG. 5.
Figure 9:
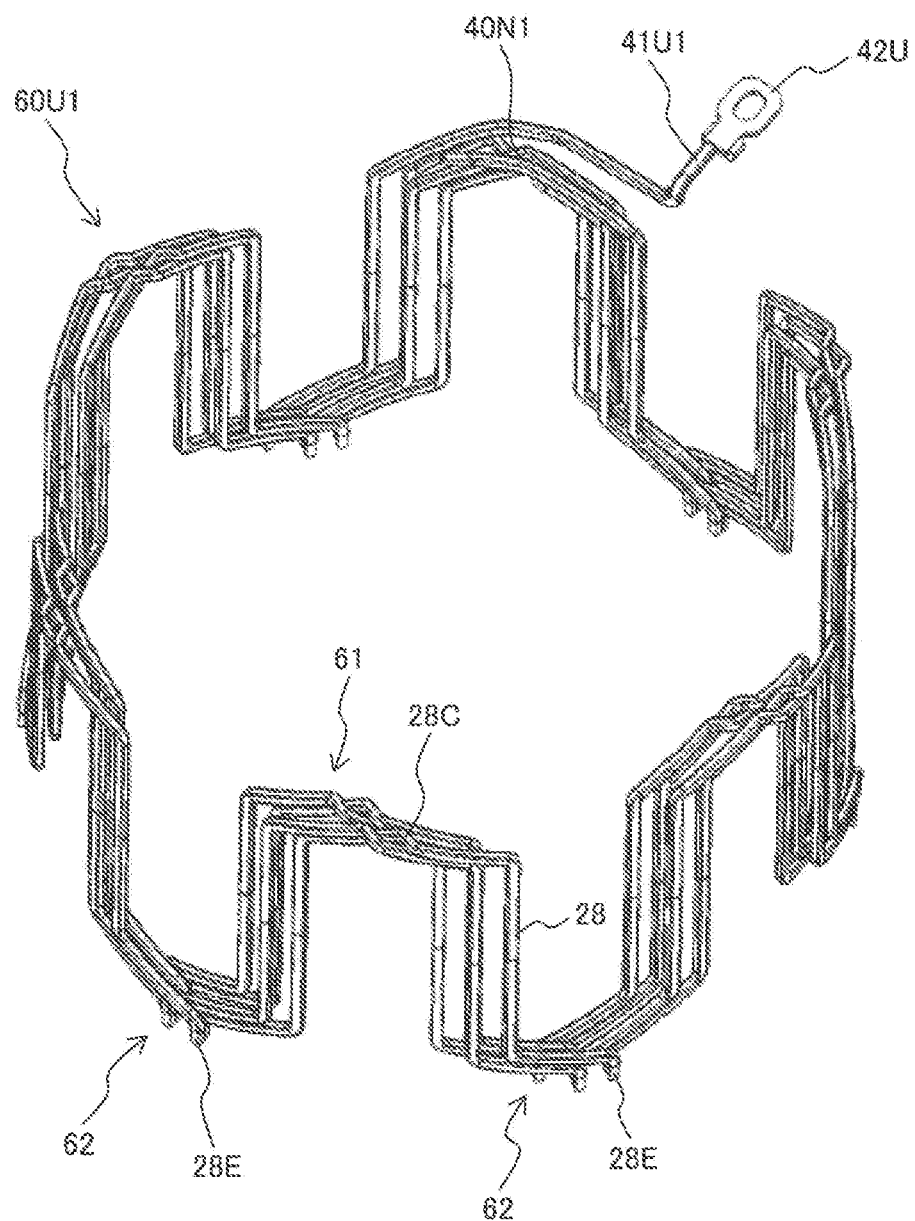
FIG. 9 is a perspective view showing a U1-phase coil 60U1.
Figure 10:
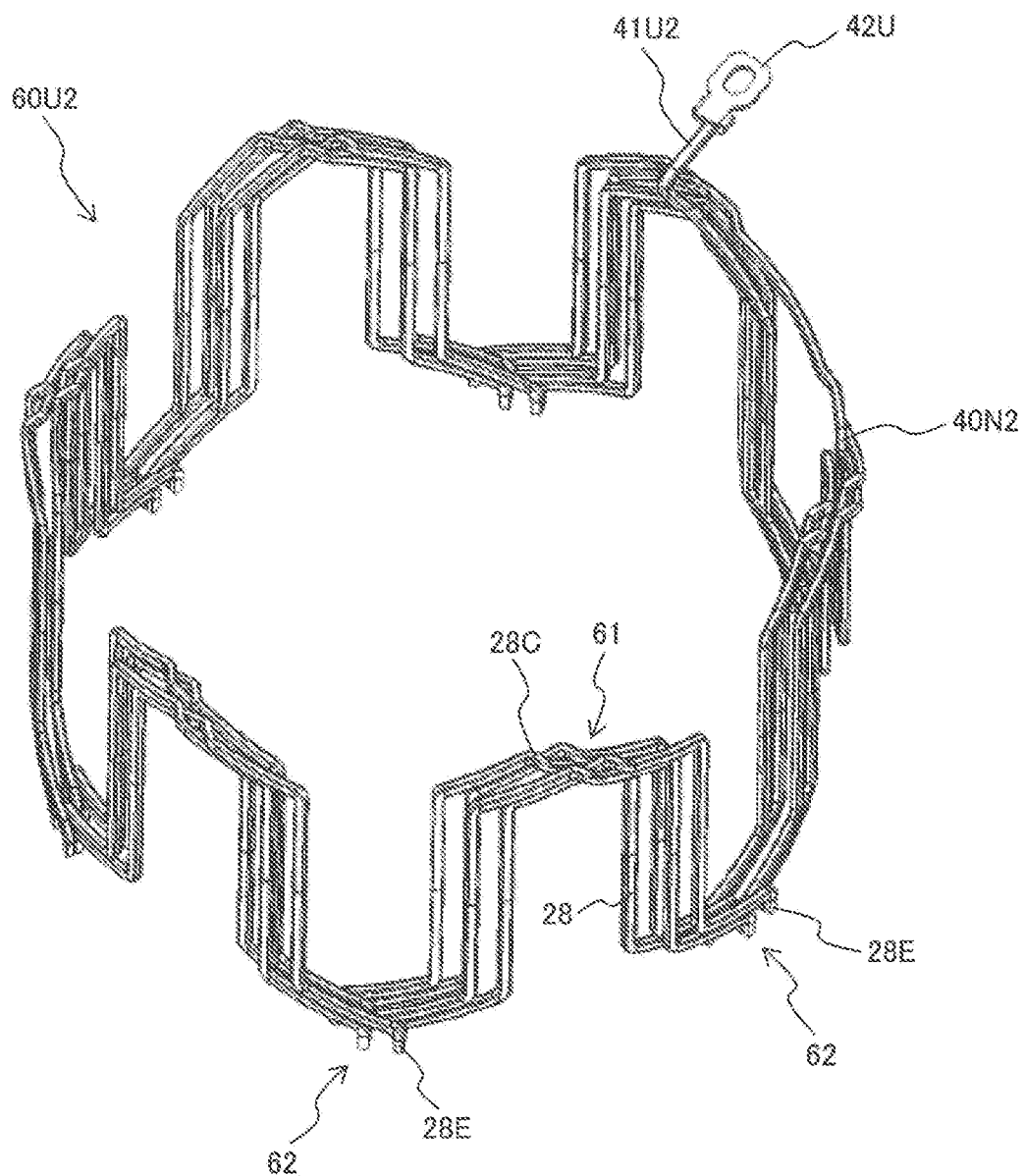
FIG. 10 is a perspective view showing a U2-phase coil 60U2.

FIG. 8 is a perspective view showing a U-phase coil 60U that is a part corresponding to one phase of a stator coil 60 shown in FIG. 5. As shown in FIG. 6, a U-phase coil 60U comprises a U1-phase coil 60U1 of a star connection and a U2-phase coil 60U2 of the other star connection. FIG. 9 is a perspective view showing a U1-phase coil 60U1. FIG. 10 is a perspective view showing a U2-phase coil 60U2. As shown in FIG. 9 and FIG. 10, a neutral point connecting conductor 40N1 is connected to the other end of the U1-phase coil 60U1 and a neutral point connecting conductor 40N2 is connected to the other end of the U2-phase coil 60U2.

(Manufacturing Method of Stator)
—Bending Work—

A manufacturing method of a stator 20 according to the present embodiment is explained hereunder. As stated earlier, after a segment conductor 28 in the state shown in FIG. 7A is inserted into slots of a stator iron core 132, the legs 28B are bent in the directions of other segment conductors 28 to be connected as shown in FIG. 7B. A leg 28B extracted from each of the slots 420 is bent in the direction of a segment conductor 28 to be connected. For example, a leg 28B1 protruding from a slot 420 is bent to the left in the circumferential direction. In contrast, a leg 28B2 having an end 28E2 is bent to the right in the circumferential direction. Then an end 28E1 and the end 28E2 are arranged so as to be adjacent to each other in a radial direction.

Figure 11:
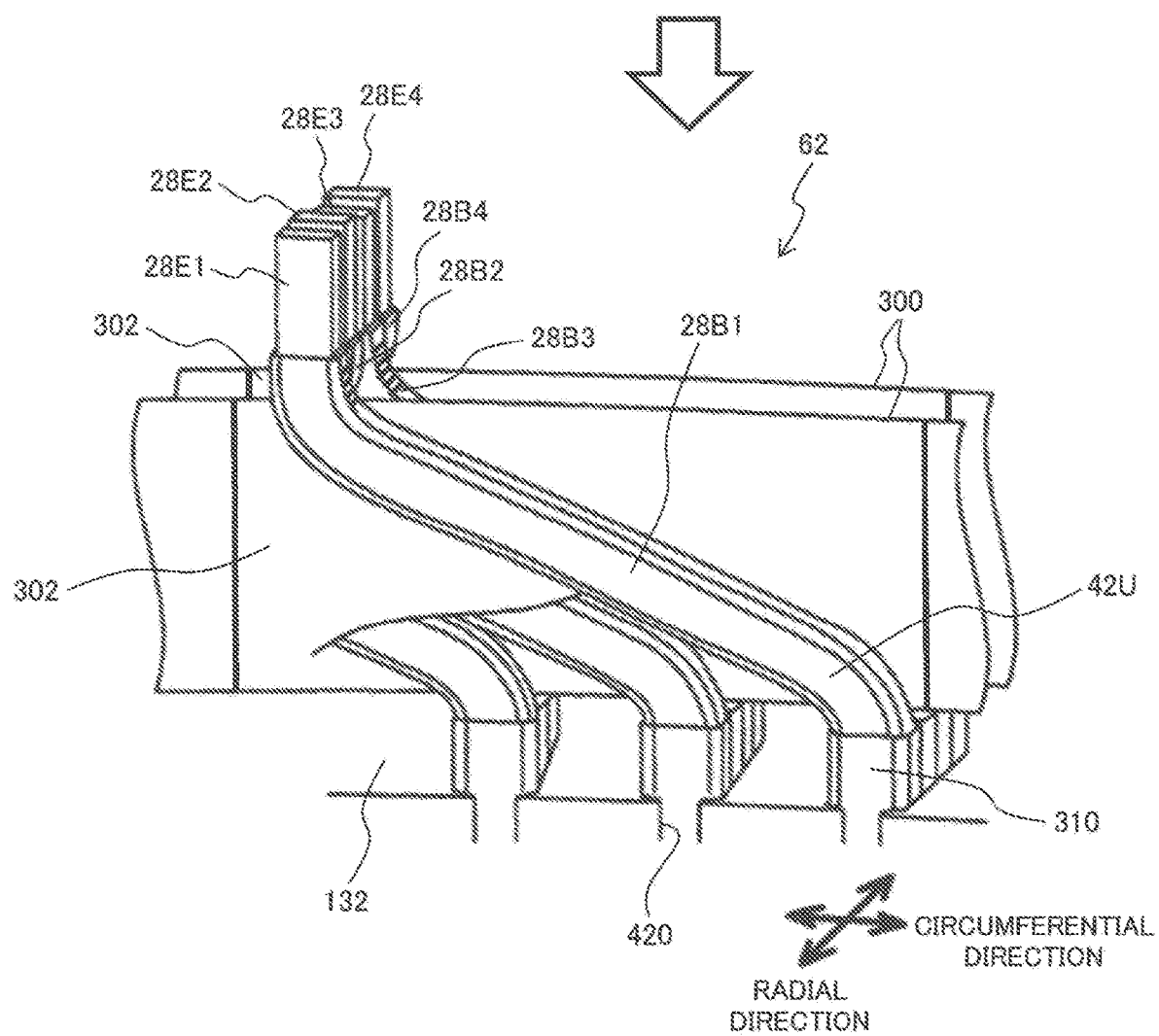
FIG. 11 is a view showing ends 28E1 to 28E4 of segment conductors 28 after bending work at a weld-side coil end 62.

FIG. 11 is a view showing an end 28E1 to an end 28E4 of segment conductors 28 after subjected to bending work at a weld-side coil end 62.

Segment conductors 28 of four rows are inserted into a slot 420 in a radial direction. Legs 28B1 to 28B4 extracted from a slot 420 are bent in the directions of segment conductors 28 to be connected. Slot liners 310 are disposed at the legs 28B1 to 28B4 inserted into the slot 420. By disposing slot liners 310, withstand voltages between segment conductors 28 and between a segment conductor 28 and the inner surface of a slot 420 improve. Here, at the parts to be connected of the ends 28E1 to 28E4, insulation films are removed and the conductors are uncovered.

In order to align the heights of the tips of the ends 28E1 to 28E4 and reduce the height of a coil end, cutting work is applied to the ends 28E1 to 28E4. When the height of the coil end is equalized, cutting work can be avoided.

By welding the tips of the ends as shown in FIG. 11, the end 28E1 is connected to the end 28E2 and the end 28E3 is connected to the end 28E4. A welded part is formed so as to straddle the end 28E1 and the end 28E2 by melting and solidifying a base material. Further, a welded part is formed so as to straddle the end 28E3 and the end 28E4 by melting and solidifying a base material. As a welding method, arc welding, TIG welding, plasma welding, or the like is used for melting and connecting the base material of a segment conductor 28. As a shield gas, argon, helium, a mixed gas of argon and helium, or the like is used.

Further, insulators 300 are disposed between the segment conductors 28 of four rows arranged and aligned in a radial direction at the weld-side coil end 62. In accordance with the increase of the switching speed of an inverter INV shown in FIG. 18, the level of surge increases, the insulation degradation of a coil in a dynamo-electric machine 10 is caused, and the service life of the dynamo-electric machine 10 is influenced. An enamel film is thickened for example therefore but the thickening of the enamel film causes the working accuracy of a coil to deteriorate. Furthermore, the cost of parts increases to the extent of the thickening of the enamel film.

By arranging overlapping parts 302 of insulators 300 at a lead wire 41U1 and a lead wire 41U2 (refer to FIG. 8), lead wires 41V1 and 41V2, and lead wires 41W1 and 41W2, to which a steep surge voltage is inputted from an inverter INV, on the side of the weld-side coil end 62, withstand voltage between segment conductors 28 improves. Moreover, it is acceptable to arrange insulators 300 also on the side of the anti-weld-side coil end 61 and overlapping parts 302 are arranged around a lead wire 41U1 and a lead wire 41U2, a lead wire 41V1 and a lead wire 41V2, and a lead wire 41W1 and a lead wire 41W2.

Figure 12:
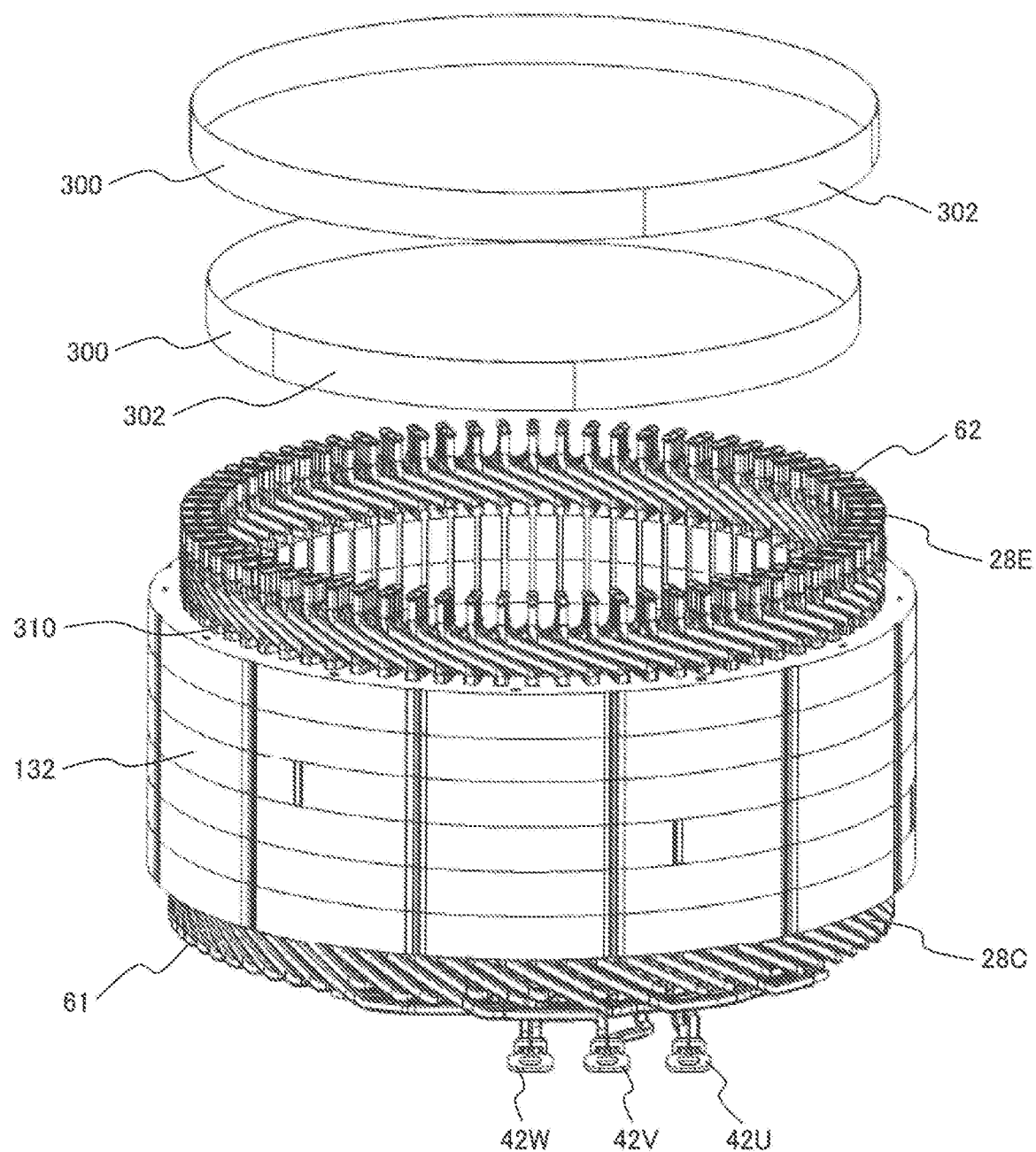
FIG. 12 is a perspective view before insulators 300 each of which has an overlapping part 302 are inserted between segment conductors 28 at a weld-side coil end 62.

FIG. 12 is a perspective view before insulators 300 each of which has an overlapping part 302 are inserted between segment conductors 28 at a weld-side coil end 62.

Figure 13:
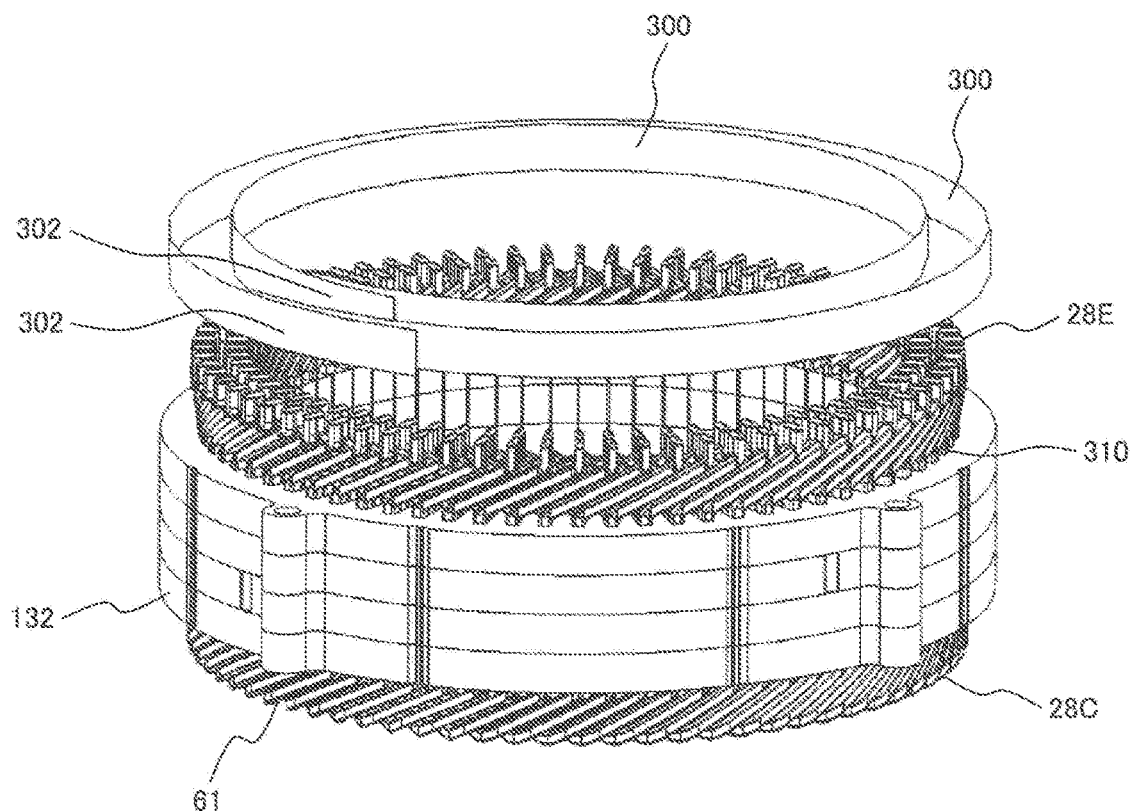
FIG. 13 is a perspective view immediately before insulators 300 each of which has an overlapping part 302 are inserted between segment conductors 28 at a weld-side coil end 62.

FIG. 13 is a perspective view immediately before insulators 300 are inserted between segment conductors 28 according to the present embodiment.

Insulators 300 are disposed annularly between segment conductors 28 in order to improve phase-to-phase insulation and conductor-to-conductor insulation at a weld-side coil end 62. Here, an insulator 300 functions also as a retaining member for preventing a resin member (polyester or epoxy liquid varnish, for example) from drooling over the whole or a part of a stator coil 60 when the resin member is dropped.

In this way, since insulators 300 and slot liners 310 are disposed on the inner sides of slots and at a coil end, a required withstand voltage can be maintained even when an insulation film of a segment conductor 28 is damaged or degraded. Here, an insulator 300 is an insulation sheet of a heat-resistant polyamide sheet, for example, and the thickness is about 0.1 to 0.5 mm. An overlapping part 302 is thicker and the thickness is about 0.2 to 1.0 mm.

Insulators 300 are arranged so that the overlapping parts 302 may be located at the positions of segment conductors 28 leading to a lead wire 41U1 and a lead wire 41U2, a lead wire 41V1 and a lead wire 41V2, and a lead wire 41W1 and a lead wire 41W2 when the insulators 300 are inserted into a weld-side coil end 62. By arranging the overlapping part of an insulator 300 so as to overlap in a direction identical to the bending direction of a coil (by setting the length of an insulator 300 in the circumferential direction so as to be longer than the length of a stator coil 60 in the circumferential direction), an insulation sheet such as an insulator 300 can be prevented from deviating in height and being rolled in during coil bending.

Although the overlapping part 302 of an insulator 300 is arranged at the position of a segment conductor 28 leading to a lead wire 41U1 and the like in the present embodiment, it is also possible to arrange an overlapping part 302 at a position where a segment conductor 28 is highly likely to be deformed by an external force.

Figure 14:
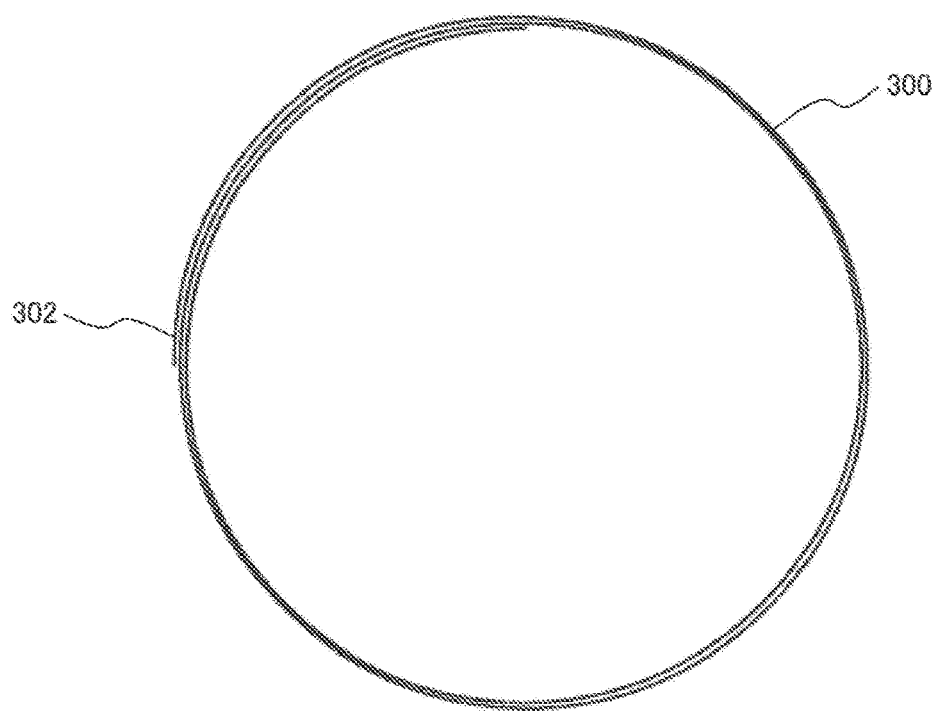
FIG. 14 shows an insulator 300 viewed from the direction parallel to the rotation axis of a dynamo-electric machine 10.

FIG. 14 shows an insulator 300 viewed from the direction parallel to the rotation axis of a dynamo-electric machine 10. In an insulator 300, an insulation sheet member of nearly a rectangle is formed nearly into a ring shape and an overlapping part 302 is produced. By arranging the overlapping of an insulator 300 so as to be directed in a direction identical to the bending direction of a coil, an insulation sheet such as an insulator 300 can be prevented from deviating in height and being rolled in during coil bending.

Figure 15:
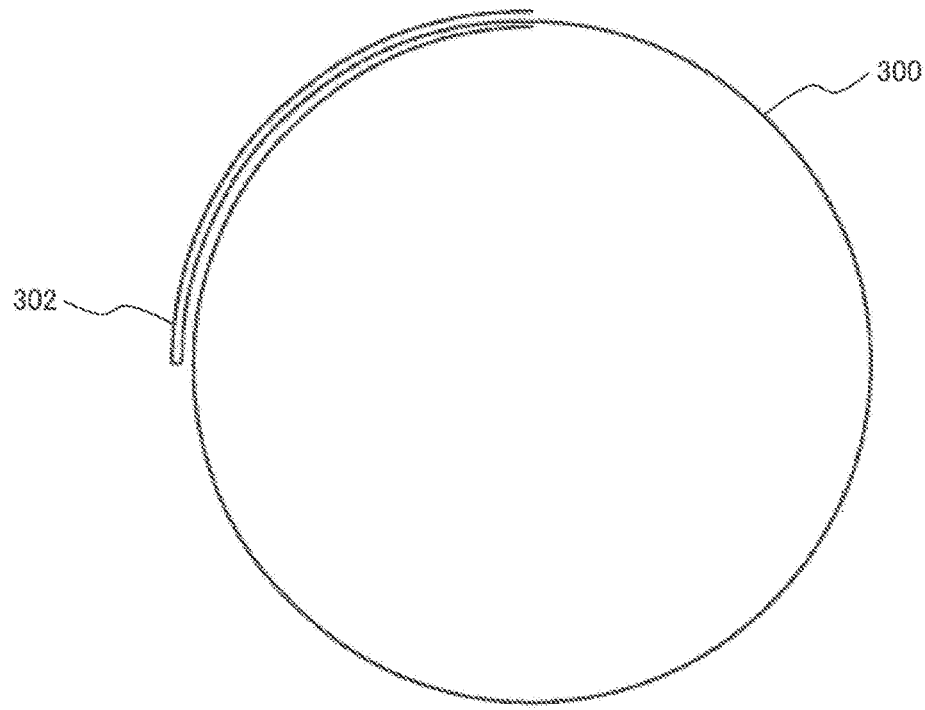
FIG. 15 shows an insulator 300 according to another embodiment viewed from the direction parallel to the rotation axis of a dynamo-electric machine 10.

FIG. 15 shows an insulator 300 according to another embodiment viewed from the direction parallel to the rotation axis of a dynamo-electric machine 10. An insulator 300 according to the present embodiment can further improve insulation characteristics by forming and using a pushed-back part as an overlapping part 302. By arranging the overlapping of an insulator 300 so as to overlap in a direction identical to the bending direction of a coil, an insulation sheet such as an insulator 300 can be prevented from deviating in height and being rolled in during coil bending.

Figure 16:
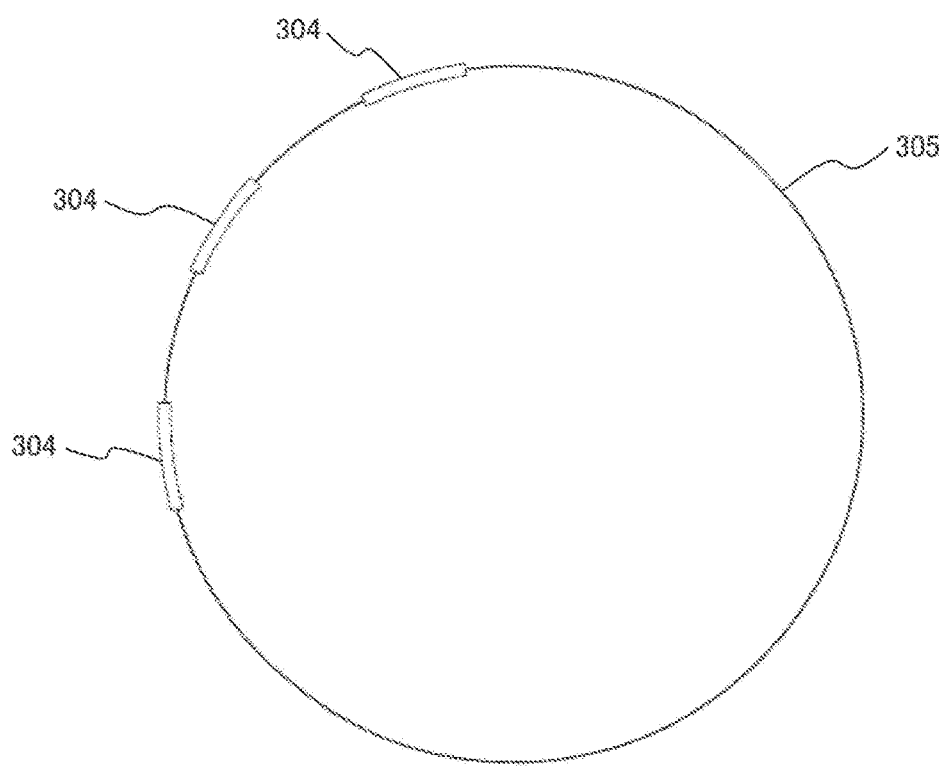
FIG. 16 shows an insulator 300 according to another embodiment viewed from the direction parallel to the rotation axis of a dynamo-electric machine 10.

FIG. 16 shows an insulator 300 according to another embodiment viewed from the direction parallel to the rotation axis of a dynamo-electric machine 10. In an insulator 305 according to the present embodiment, thick resin parts 304 formed thicker than the other part are arranged in the ranges where segment conductors 28 leading to a lead wire 41U1 and a lead wire 41U2, a lead wire 41V1 and a lead wire 41V2, and a lead wire 41W1 and a lead wire 41W2 are arranged. The insulator 305 is formed by molding a resin. The insulator 305 can be inserted easily into a weld-side coil end 62 and workability also improves. Because of a resin-formed product, deviation and rolled-in can be prevented during coil bending.

FIG. 17A is a side view of an insulator 300 before an overlapping part 302 is folded according to another embodiment. FIG. 17B is a side view of an insulator 300 after an overlapping part 302 is folded according to another embodiment. FIG. 17C shows an insulator 300 according to another embodiment viewed from the direction parallel to the rotation axis of a dynamo-electric machine 10.

In an insulator 300, an overlapping part 302 is arranged in a range where segment conductors 28 leading to a lead wire 41U1 and a lead wire 41U2, a lead wire 41V1 and a lead wire 41V2, and a lead wire 41W1 and a lead wire 41W2 are arranged. By bending an insulation sheet to the side of the axial direction, an insulation sheet such as an insulator can be prevented from deviating in height and being rolled in during coil bending.

Although various embodiments and modifications are explained heretofore, the present invention is not limited to those contents. Other embodiments conceivable in the range of the technological thought of the present invention are also included in the scope of the present invention.

DESCRIPTION OF THE REFERENCE NUMERALS AND SIGNS

10 Dynamo-electric machine
11 Rotator
20 Stator
28 Segment conductor
28B1 to 28B4 Leg
28C Crown
28E End
28E1 to 28E6 End
60 Stator coil
62 Weld-side coil end
132 Stator iron core
281 Circumferential direction side surface
300 Insulator
302 Overlapping part
304 Thick resin part
305 Insulator
420 Slot

What is claimed is:

1. A stator of a dynamo-electric machine comprising:
    a stator iron core in which a plurality of slots aligned in the circumferential direction are formed;
    a plurality of segment coils inserted into the slots and formed nearly into a U-shape; and
    an insulator arranged between the segment coils, wherein
        the insulator has first parts thereof that are formed thicker than other parts thereof,
        the first parts are circumferentially separated from one another by second parts having a smaller thickness than a thickness of the first parts,
        the first parts are disposed at locations where segment conductors lead wires are arranged, and
        a circumferential length of the first parts is approximately equal to a circumferential length of the second parts.

2. A stator of a dynamo-electric machine according to claim 1, wherein:
    the insulator is formed so as to be longer than the length in the circumferential direction of the stator where the segment coils are aligned; and
    a thicker part of the insulator is formed by overlapping a part including both the ends of the insulator in the circumferential direction.

3. A stator of a dynamo-electric machine according to claim 1, wherein a segment conductor in the segment coils overlapping with the thicker part of the insulator leads to a lead wire.

4. A stator of a dynamo-electric machine according to claim 3, wherein the lead wire comprises a plurality of lead wires corresponding to a U-phase, a V-phase, and a W-phase respectively.

5. A dynamo-electric machine using a stator according to claim 1, wherein the dynamo-electric machine has a rotator facing the stator.

* * * * *